United States Patent [19]

Sakae

[11] Patent Number: 5,319,057
[45] Date of Patent: Jun. 7, 1994

[54] CURABLE COMPOSITION CONTAINING A POLYSULFIDE POLYETHER AND A COMPOUND HAVING AT LEAST TWO ISOCYANATE GROUPS

[75] Inventor: Kazuhisa Sakae, Ichihara, Japan

[73] Assignee: Toray Thiokol Co., Ltd., Urayasu, Japan

[21] Appl. No.: 67,080

[22] Filed: May 26, 1993

[51] Int. Cl.$^5$ .................... C08G 18/18; C08G 18/50
[52] U.S. Cl. ........................ 528/53; 528/54; 528/60; 528/66; 528/76; 528/77
[58] Field of Search .................. 528/60, 61, 66, 76, 528/77, 53, 54

[56] References Cited

U.S. PATENT DOCUMENTS

| | | | |
|---|---|---|---|
| 2,466,963 | 4/1949 | Patrick et al. | 528/387 |
| 2,814,600 | 11/1957 | Mitchell, III | 528/76 |
| 2,989,512 | 6/1961 | Nischk et al. | 528/76 |
| 3,386,963 | 6/1968 | Santaniello | 528/76 |
| 3,484,418 | 12/1969 | Vandenberg | 528/76 |
| 3,736,301 | 5/1973 | Berenbaum | 528/66 |
| 3,923,748 | 12/1975 | Hutt et al. | 528/75 |
| 4,110,295 | 8/1978 | Wilhelm et al. | 528/374 |
| 5,212,231 | 5/1993 | Woollard | 528/76 |

FOREIGN PATENT DOCUMENTS 3-134058 6/1991 Japan .
4-7331 1/1992 Japan .

*Primary Examiner*—Morton Foelak
*Assistant Examiner*—Rabon Sergent
*Attorney, Agent, or Firm*—Armstrong, Westerman, Hattori, McLeland & Naughton

[57] ABSTRACT

The curable composition which includes:

(A) a polysulfide polyether having in a main chain:
  (i) a polyether moiety represented by $-(R_1O)_n-$, wherein $R_1$ is an alkylene group having 2-4 carbon atoms, and n is an integer of 6-200;
  (ii) structural units represented by $$-C_2H_4OCH_2OC_2H_4-S_x-,$$

and $$-CH_2CH(OH)CH_2-S_x-$$

wherein x is an integer of 1-5; and at both ends:
  (iii) a thiol group represented by $$-C_2H_4OCH_2OC_2H_4-SH,$$

and/or $$-CH_2CH(OH)CH_2-SH;$$

and (B) a compound having two or more isocyanate groups in one molecule;

a molar ratio of isocyanate groups contained in the component (B) to thiol groups contained in the component (A) being 0.5–4.0 (isocyanate groups/thiol groups).

4 Claims, No Drawings

CURABLE COMPOSITION CONTAINING A POLYSULFIDE POLYETHER AND A COMPOUND HAVING AT LEAST TWO ISOCYANATE GROUPS

BACKGROUND OF THE INVENTION

The present invention relates to a curable composition, and more particularly to a curable composition which less suffers from foaming at the time of curing, and is capable of producing a cured product which is white and has such good weathering resistance that can prevent occurrences of surficial cracks even when the cured product is exposed outdoors, and which curable composition needs small amounts of plasticizers, thereby producing a cured product which is suitable for sealing materials because it suffers from so little transfer of plasticizers into a paint coating applied thereonto that it avoids the softening of the paint coating.

When polymers containing two or more thiol groups in one molecule are mixed with an oxidizing agent, they are easily cured, and their thiol groups are easily reacted with epoxy groups, isocyanate groups, etc. to become high-molecular compounds. Accordingly, such polymers are widely used for sealing materials, paints, adhesives, etc.

Since this polysulfide polymer has a structure of polysulfide bonds $S_x$ ($x=1-5$) in a molecule, it shows high polarity, and only limited types of plasticizers can be used. Since widely used, inexpensive plasticizers cannot be used, compositions such as sealants containing the polysulfide polymer are relatively expensive. In addition, since it shows a higher viscosity than expected from considering its molecular weight, a larger amount of a plasticizer is required to be added to improve the handling of the composition at a curing temperature. Accordingly, when a cured product of a sealant produced from the polysulfide polymer is covered by a paint coating, plasticizers tend to exude, thereby softening the paint coating.

Japanese Patent Laid-Open No. 3-134058 discloses a polymer composition comprising a polysulfide polymer and a thiol group-containing polyether. This composition is compatible with widely used, inexpensive plasticizers and suitable for sealing materials. Further, it only needs small amounts of plasticizer. Japanese Patent Laid-Open No. 4-7331 discloses a polysulfide polymer which is also compatible with widely used, inexpensive plasticizers and only needs small amounts of plasticizer. Further, since this polysulfide polymer contains reduced amounts of low-molecular weight components, a cured product obtained by curing it with an oxidizing agent, etc. shows improved elongation. In addition, when a paint is applied to a cured product of a sealant produced from these polymers, the paint coating is not likely to be softened by the transference of plasticizers.

However, since an oxidizing agent having a large oxidizing power such as $PbO_2$, $MnO_2$, etc. is used as a curing agent for each of a thiol group-containing polysulfide polymer and polysulfide polyether, it is inevitable for them to be colored by the oxidizing agent, thereby failing to provide a white cured product. Further, since the reaction between inorganic oxidizing agents such as $PbO_2$, $MnO_2$, etc. and polysulfide polymer is a solid-liquid reaction, it is difficult to control the curing rate.

Since a sealant of a polyurethane prepolymer produced by reacting a polyether polyol with a polyisocyanate compound has good compatibility with widely used plasticizers and also has low viscosity, it is unlikely that a paint coating applied to a cured product of the polyurethane prepolymer is softened. However, this polyurethane prepolymer has such a problem that when it is cured with or without a polyol and a catalyst under the conditions of high temperatures and humidities, it tends to suffer from foaming.

OBJECT AND SUMMARY OF THE INVENTION

Accordingly, the object of the present invention is to provide a curable composition which needs a reduced amount of plasticizer and is capable of easily producing a white cured product while causing no foaming, and whose cured product has such a good weathering resistance that can prevent the occurrence of surficial cracks even when it is exposed outdoors.

As a result of intense research in view of the above objects, the inventors have found that by using a compound having one or more isocyanate groups in one molecule instead of an inorganic oxidizing agent such as $PbO_2$, etc., a polysulfide polyether having a polyether moiety in a main chain can be cured without being accompanied by foaming, while obtaining a white cured product which shows such a good weathering resistance that can prevent the occurrence of surficial cracks even when it is exposed outdoors.

The present invention has been completed based upon this finding.

Thus, the curable composition according to the present invention comprises:

(A) a polysulfide polyether having in a main chain:
  (i) a polyether moiety represented by $-(R_1O)_n-$, wherein $R_1$ is an alkylene group having 2-4 carbon atoms, and n is an integer of 6-200;
  (ii) structural units represented by

  $-C_2H_4OCH_2OC_2H_4-S_x-$, and

  $-CH_2CH(OH)CH_2-S_x-$ wherein x is an integer of 1-5; and at both ends:
  (iii) a thiol group represented by

  $-C_2H_4OCH_2OC_2H_4-SH$, and/or

  $-CH_2CH(OH)CH_2-SH$;

and (B) a compound having two or more isocyanate groups in one molecule;

a molar ratio of isocyanate groups contained in the component (B) to thiol groups contained in the component (A) being 0.5–4.0 (isocyanate groups/thiol groups).

DETAILED DESCRIPTION OF THE INVENTION

[A] Polysulfide polyether

The polysulfide polyether used in the present invention has in a main chain:
  (i) a polyether moiety represented by $-(R_1O)_n-$, wherein $R_1$ is an alkylene group having 2-4 carbon atoms, and n is an integer of 6-200;
  (ii) structural units represented by —$C_2H_4OCH_2OC_2H_4$—$S_x$—, and —$CH_2CH(OH)CH_2$—$S_x$—, wherein x is an integer of 1–5; and at both ends:
(iii) a thiol group represented by

—$C_2H_4OCH_2OC_2H_4$—SH, and/or

—$CH_2CH(OH)CH_2$—SH.

In this polysulfide polyether, the polyether moiety (i) and the structural units (ii) may be combined in any order. With respect to their preferable proportions, an —$(R_1O)_n$— component is 2–95 weight %, a —$C_2H_4OCH_2OC_2H_4$— component is 3–70 weight %, a —$CH_2CH(OH)CH_2$— component is 1–50 weight %, and a polysulfide bond $S_x$ is 1–60 weight %.

When the —$(R_1O)_n$— component is less than 2 weight %, a sufficient effect of improving compatibility with plasticizers cannot be obtained. On the other hand, when it exceeds 95 weight %, the resulting cured product shows a poor weathering resistance.

When the —$C_2H_4OCH_2OC_2H_4$— component is less than 3 weight %, the resulting cured product shows a poor weathering resistance. On the other hand, when it exceeds 70 weight %, a sufficient effect of improving compatibility with plasticizers cannot be obtained.

When the —$CH_2CH(OH)CH_2$— component is less than 1 weight %, a sufficient effect of improving compatibility with plasticizers cannot be obtained. On the other hand, when it exceeds 50 weight %, the resulting cured product shows a poor weathering resistance.

When the content of the polysulfide bonds $S_x$ is less than 1 weight %, the resulting cured product shows a poor weathering resistance. On the other hand, when it exceeds 60 weight %, a sufficient effect of improving compatibility with plasticizers cannot be obtained.

The polysulfide polyether has a number-average molecular weight ($\overline{Mn}$) of generally 600–200,000, and preferably 800–50,000.

Such polysulfide polyether can be synthesized by two known methods described in Japanese Patent Laid-Open No. 4-7331.

[1] First method

The first method of producing this polysulfide polyether comprises causing a reaction of:
(a) a polysulfide polymer starting material represented by:
HS($C_2H_4OCH_2OC_2H_4S_x$)$_m$$C_2H_4OCH_2OC_2H_4$SH,
wherein x is an integer of 1–5 averaging about 2, and m is an integer of 1–50; with
(b) a polyether having in a main chain a polyether moiety represented by —$(R_1O)_n$—, wherein $R_1$ is an alkylene group having 2–4 carbon atoms, and n is an integer of 6–200, and a structural unit represented by —$CH_2CH(OH)CH_2$—$S_x$—, wherein x is an integer of 1–5, and at both ends a thiol group represented by —$CH_2CH(OH)CH_2$—SH,
at a weight ratio (a)/(b)=95/5–5/95.

In the above reaction, acids may be added to restrain the production of low molecular-weight by-products.

The above polysulfide polymer starting material (a) shows fluidity at room temperature and has a molecular weight of 100–200,000, preferably 400–50,000. Preferable examples of such polysulfide polymer starting materials are described in U.S. Pat. No. 2,466,963.

The above thiol group-containing polyether (b) contains a polyether moiety represented by —$(R_1O)_n$— in a main chain, wherein $R_1$ is an alkylene group having 2–4 carbon atoms, and n is an integer of 6–200. This polyether moiety preferably has a molecular weight of 400–10,000. When its molecular weight is less than 400, it does not have a sufficient effect of improving compatibility with plasticizers when reacted with the polysulfide polymer. On the other hand, when the molecular weight exceeds 10,000, the thiol group-containing polyether shows an undesirably high viscosity.

This thiol group-containing polyether (b) also has, in a main chain, the structural unit represented by:

—$CH_2CH(OH)CH_2$—$S_x$—, wherein x is an integer of 1–5,
and at ends a thiol group represented by:

—$CH_2CH(OH)CH_2$—SH.

$S_x$ in the thiol group-containing polyether is preferably disulfide, and a weight ratio of a polysulfide component to a mercaptan component is preferably 1.06 or more. When a weight ratio of a polysulfide component to a mercaptan component is less than 1.06, the percentage of the polysulfide bond $S_x$ is insufficient, whereby compatibility of the thiol group-containing polyether with the polysulfide polymer starting material is undesirably low.

Such thiol group-containing polyether (b) can be synthesized by known methods described in Japanese Patent Publication No. 47-48279. Specifically, by reacting polyalkylene glycol such as polypropylene glycol, polyethylene glycol, etc. with epihalohydrin such as epichlorohydrin, epibromohydrin, etc. and then causing its reaction with an alkali hydrosulfide such as sodium hydrosulfide, potassium hydrosulfide, etc. represented by MSH, wherein M is an alkali metal such as Na, K, and/or an alkali polysulfide represented by $M_2S_x$, wherein M is an alkali metal and x is an integer of 1–5, there can be obtained a polyether having at ends a thiol group, and represented, for instance, by the following general formula (1):

$$\text{HS}-\text{CH}_2-\underset{\text{OH}}{\text{CH}}-\text{CH}_2+\text{O}-\underset{R_3}{\text{CH}}-\text{CH}_2\!\!\underset{n}{\overline{\phantom{\big)}}}\text{O}-\text{CH}_2-\underset{\text{OH}}{\text{CH}}-\text{CH}_2 \qquad (1)$$
$$+\text{S}_x\text{-CH}_2\!\!-\underset{\text{OH}}{\text{CH}}-\text{CH}_2+\text{O}-\underset{R_3}{\text{CH}}-\text{CH}_2\!\!\underset{n}{\overline{\phantom{\big)}}}\text{O}-\text{CH}_2\!\!-\underset{\text{OH}}{\text{CH}}-\text{CH}_2\!\!\underset{m}{\overline{\phantom{\big)}}}\text{SH}$$

wherein $R_3$ is hydrogen or a methyl group, n is an integer of 6–200, m is an integer of 0–2, and x is an integer of 1–5.

The polymer thus obtained partially contains polysulfide bonds $S_x$ in a main chain.

In the first method of producing the polysulfide polyether of the present invention, a mixing ratio of the polysulfide polymer starting material to the thiol group-containing polyether is, by weight ratio, 95/5–5/95, preferably 90/10–10/90. When the polysulfide polymer starting material is less than 5 weight %, the resulting cured product shows a poor weathering resistance. On the other hand, when the content of the thiol group-containing polyether is less than 5 weight %, a sufficient effect of improving compatibility with plasticizers cannot be obtained.

The reaction conditions of the polysulfide polymer starting material and the thiol group-containing polyether are 30°–150° C., preferably 50°–120° C. for 2–48 hours, preferably 4–10 hours while stirring.

On this stage, 0.01–10 parts by weight of acids may be added, if appropriate, in a form of a solution in a solvent such as water, ethanol, etc. to 100 parts by weight of the above mixture of the polysulfide polymer starting material and the thiol group-containing polyether. Both inorganic acids and organic acids are applicable in this method.

The reaction between the polysulfide polymer starting material and the thiol group-containing polyether is a reaction exchanging polysulfide bonds for thiol groups, which is exemplified by the equation (2-1), or an exchange reaction of polysulfide bonds $S_x$ exemplified by the equation (2-2):

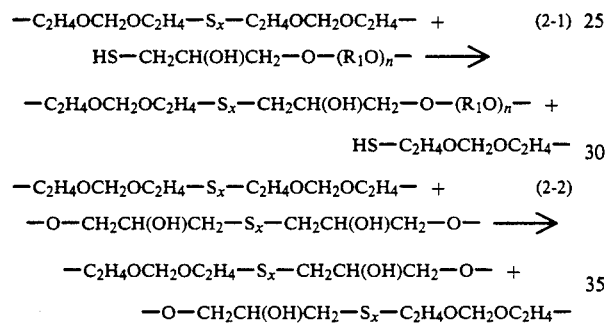

By these reactions, the polyether moiety is introduced into the main chain of the polysulfide polymer starting material. During these reactions, there is produced a low-molecular weight component represented by the following general formula (3):

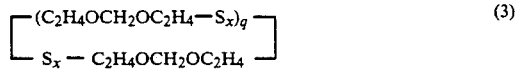

wherein q is an integer of 0–2, and x is an integer of 1–5.

Here, when this low-molecular weight component is heated at 30°–150° C., preferably 50°–120° C., or when the pH value of the reaction mixture is shifted to the acidic side by adding acids, cleavages take place at positions of $S_x$ in the above low-molecular weight component, and the resulting decomposed products participate in the above reactions (2-1), (2-2), thereby causing the narrowing of a molecular weight distribution of the polysulfide polyether, and reducing the amount of the low-molecular weight component represented by the general formula (3) to 10 weight % or less.

[2] Second method

Alternatively, the polysulfide polyether can be produced by a single-step reaction by adding a polysulfide polymer starting material in advance in the synthesis of the thiol group-containing polyether in the above first method.

In this second method, a polyalkylene glycol having a main chain represented by —$(R_1O)_n$— wherein $R_1$ is an alkylene group having 2–4 carbon atoms, and n is an integer of 6–200, and two or more hydroxyl groups at ends, such as polypropylene glycol, polyethylene glycol, etc. is reacted with epihalohydrin such as epichlorohydrin, epibromohydrin, etc. to produce a halogen-terminated prepolymer, and end groups of this halogen-terminated prepolymer are substituted by thiol groups by reaction with alkali hydrosulfides such as sodium hydrosulfide, potassium hydrosulfide, etc. and/or alkali polysulfides such as sodium polysulfide, potassium polysulfide, etc. In this reaction, a polysulfide polymer starting material represented by the general formula (4):

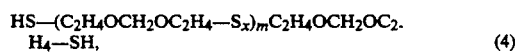

wherein x is an integer of 1–5 averaging about 2, and m is an integer of 1–50, is added and allowed to react with the above compositions simultaneously.

Also, in this second method, 0.01–10 parts by weight of acids may be added to 100 parts by weight of the above mixture of the halogen-terminated prepolymer and polysulfide polymer starting material. This causes cleavages in the low-molecular weight component, thereby making the resulting decomposed products participate in the synthesis of polysulfide polyether.

In the second method, a weight ratio of the halogen-terminated prepolymer to the polysulfide polymer starting material is 95/5–5/95, preferably 90/10–10/90. When the content of the polysulfide polymer starting material is less than 5 weight %, the resulting cured product shows a poor weathering resistance. On the other hand, when the content of the halogen-terminated prepolymer is less than 5 weight %, a sufficient effect of improving compatibility with plasticizers cannot be obtained.

As the alkali hydrosulfides, a technical grade of flake sodium hydrosulfide is preferable. This sodium hydrosulfide has a purity of about 70%, and contains trace amounts of sodium polysulfide component.

The amount of MSH and/or $M_2S_x$ is generally 1–50 parts by weight, preferably 2–35 parts by weight, per 100 parts by weight of the total of polysulfide polymer starting material and halogen-terminated prepolymer. When the amount of MSH and/or $M_2S_x$ is lower than 1 part by weight, the halogen groups of the halogen-terminated prepolymer cannot sufficiently be substituted by thiol groups. On the other hand, when it exceeds 50 parts by weight, the polymer shows an extremely increased viscosity in its synthesis.

In the second method, by substituting halogen groups of the halogen-terminated prepolymer with thiol groups in the presence of the polysulfide polymer starting material under the same conditions as in the first method, the above reactions (2-1) and (2-2) take place as in the first method.

[B] Compound having two or more isocyanate groups in one molecule

The compounds having two or more isocyanate groups in one molecule usable in the present invention may preferably be an organic polyisocyanate compound or an isocyanate prepolymer obtained by reacting an active hydrogen-containing compound with an excess amount of polyisocyanate compound.

Specific examples of the organic polyisocyanate compounds include tolylene diisocyanate, diphenylmethane diisocyanate, polymethylene polyphenyl isocyanate (crude MDI), xylene diisocyanate, isophorone diisocyanate, hexamethylene diisocyanate, etc.

Specific examples of the active hydrogen-containing compounds include hydroxyl group-terminated polyesters, multivalent polyoxyalkylene ethers, hydroxyl group-terminated polyurethane polymers, acrylic polyols obtained by introducing hydroxyl groups into acrylic copolymers, hydroxyl group-terminated polybutadienes, multivalent polythioethers, polyacetal; alkanes, alkenes, and aliphatic thiols containing alkylene thiols having two or more thiol groups; diamines such as aromatic diamines, aliphatic diamines, heterocyclic diamines, etc. These compounds can be used alone or in combination.

[C] Curable composition

The above-described polysulfide polyether (A) and the compound (B) having two or more isocyanate groups in one molecule are mixed at such a molar ratio that isocyanate groups contained in the component (B) to thiol groups contained in the component (A) is 0.5-4.0 (isocyanate groups/thiol groups). When the molar ratio is less than 0.5, the resulting curable compositions fail to have sufficiently high molecular weights. On the other hand, when the molar ratio is more than 4.0, a cured product of the curable composition is hard and brittle. The preferred molar ratio is 0.7-3.0.

To cause the curing reaction of the composition fast and surely after applying it to a proper place, an appropriate amount of a catalyst for accelerating reactions between thiol groups and isocyanate groups may further be added to the curable composition of the present invention.

Specific examples of such catalysts include tertiary amines such as triethylamine, triethylenediamine, pentamethylenediethylenetriamine, tetramethylhexamethylenediamine, dimethylcyclohexylamine, 1-8-diazobicyclo(5,4,0)-undecene-7, etc.; and organometallic compounds such as dibutyltin dilaurate, dibutyltin dimaleate, lead octanoate, etc. Among them, tertiary amines are preferable, because reactions between thiol groups and isocyanate groups proceed swiftly in the presence of a tertiary amine, thereby reducing foaming caused by a reaction between isocyanate groups and water. The preferable amount of the catalyst to be added is 0.001-1.0 parts by weight per 100 parts by weight of the total of the components (A) and (B).

The curable composition of the present invention may further contain fillers such as calcium carbonate, talc, clay, titanium oxide, silica, etc. for economic reasons and for improving extrudability and properties of the cured products. Further, since the curable compositions of the present invention are compatible with inexpensive phthalate plasticizers such as dioctyl phthalate (DOP), diheptyl phthalate (DHP), etc., which cannot be used in the case of polysulfide polymers alone, these plasticizers can be added. In addition, plasticizers such as chlorinated paraffin, hydrogenated terphenyl, etc. may be added.

As disclosed in Japanese Patent Laid-Open No. 3-62817, the curable composition of the present invention may further contain hydroxycarboxylic acids or carboxylics to attain a sufficient mixing time.

Specific examples of the hydroxycarboxylic acids include multivalent hydroxycarboxylic acids such as tartaric acid, citric acid, etc. Specific examples of the carboxylics include monocarboxylic acids such as acetic acid, propionic acid, lauric acid, stearic acid, etc., and multivalent carboxylic acids such as oxalic acid, adipic acid, succinic acid, etc. The preferable amount of these hydroxycarboxylic acids and/or carboxylics to be added is 0.01- 1 parts by weight per 100 parts by weight of the total of the components (A) and (B).

The present invention will be explained in further detail by way of the following Examples.

SYNTHESIS EXAMPLE 1

1200 g of bifunctional polypropylene glycol (OH value: 28.7) obtained by adding propylene oxide to propylene glycol, 62.6 g of epichlorohydrin, and 2.4 g of stannic chloride pentahydrate ($SnCl_4.5H_2O$) were introduced into a 2-liter-reactor, and stirred at 110° C. for 3 hours. Further, 54.1 g of sodium hydrosulfide (purity: 70%) was added, and a reaction mixture was stirred at 100° C. for 1.5 hours. A salt was then removed to obtain a transparent, pale yellow liquid polymer. The resulting polymer contained 1.2 weight % of mercaptan.

SYNTHESIS EXAMPLE 2

516 g of the polymer obtained in Synthesis Example 1 and 84 g of a polysulfide polymer ("THIOKOL LP55," manufactured by Toray Thiokol Co., Ltd.) were introduced into a 1-liter-reactor, and stirred at 90° C. for 5 hours. The resulting polymer had a mercaptan content of 1.0 weight % and a viscosity of 90 poise (25° C.).

SYNTHESIS EXAMPLE 3

1000 g of bifunctional polypropylene glycol (OH value: 56) obtained by adding propylene oxide to propylene glycol, 102 g of epichlorohydrin, and 1.3 g of stannic chloride pentahydrate ($SnCl_4.5H_2O$) were introduced into a 3-liter-reactor, and stirred at 100° C. for 3 hours. Further, 85 g of sodium hydrosulfide (purity: 70%) and 902 g of a polysulfide polymer ("THIOKOL LP55") were added, and the reaction mixture was stirred for 4 hours. Then, 4.0 g of an aqueous solution of citric acid (concentration: 50%) was further added to the reaction mixture and the resulting mixture was stirred for 15 minutes followed by dehydration. A salt was then removed to obtain a transparent, pale yellow liquid polymer. The resulting polymer had a thiol group content of 2.2 weight % and a viscosity of 82 poise (25° C.).

SYNTHESIS EXAMPLE 4

1000 g of bifunctional polypropylene glycol (OH value: 56) obtained by adding propylene oxide to propylene glycol, 102 g of epichlorohydrin, and 1.3 g of stannic chloride pentahydrate ($SnCl_4.5H_2O$) were introduced into a 3-liter-reactor, and stirred at 100° C. for 3 hours. Further, 10.2 g of sodium hydrosulfide (purity: 70%), 124.28 of sodium sulfide (purity: 31%) and 902 g of a polysulfide polymer ("THIOKOL LP55") were added, and the reaction mixture was stirred for 4 hours. Then, 6.0 g of an aqueous solution of citric acid (concentration: 50%) was further added to the reaction mixture and the resulting mixture was stirred for 15 minutes followed by dehydration. A salt was then removed to obtain a transparent, pale yellow liquid polymer. The resulting polymer had a thiol group content of 1.2 weight % and a viscosity of 190 poise (25° C.).

EXAMPLE 1

The polymer obtained in Synthesis Example 2 was mixed with various plasticizers shown in Table 1 at a weight ratio (polymer/plasticizer) of 10/5 to measure compatibility. The results are shown in Table 1.

EXAMPLE 2

The polymer obtained in Synthesis Example 3 was mixed with various plasticizers shown in Table 1 at a weight ratio (polymer/plasticizer) of 10/5 to measure compatibility. The results are shown in Table 1.

EXAMPLE 3

The polymer obtained in Synthesis Example 4 was mixed with various plasticizers shown in Table 1 at a weight ratio (polymer/plasticizer) of 10/5 to measure compatibility. The results are shown in Table 1.

COMPARATIVE EXAMPLE 1

A polysulfide polymer ("THIOKOL LP55") was mixed with various plasticizers shown in Table 1 at a weight ratio (polymer/plasticizer) of 10/5 to measure compatibility. The results are shown in Table 1.

TABLE 1

| Plasticizer | Example 1 | Example 2 | Example 3 | Comparative Example 1 |
|---|---|---|---|---|
| Dibutyl Phthalate (DBP) | Uniform, Transparent | Uniform, Transparent | Uniform, Transparent | Uniform, Transparent |
| Butylbenzyl Phthalate (BBP) | Uniform, Transparent | Uniform, Transparent | Uniform, Transparent | Uniform, Transparent |
| Diheptyl Phthalate (DHP) | Uniform, Transparent | Uniform, Transparent | Uniform, Transparent | Phase Separation |
| Dioctyl Phthalate (DOP) | Uniform, Transparent | Uniform, Slightly Translucent | Uniform, Transparent | Phase Separation |
| Diisononyl Phthalate (DINP) | Uniform, Transparent | Uniform, Slightly Translucent | Uniform, Transparent | Phase Separation |
| Diisodecyl Phthalate (DIDP) | Uniform, Slightly Translucent | Uniform, Slightly Translucent | Uniform, Transparent | Phase Separation |
| Dibutyl Sebacate (DBS) | Uniform, Transparent | Uniform, Transparent | Uniform, Transparent | Phase Separation |
| Dioctyl Adipate (DOA) | Uniform, Transparent | Uniform, Slightly Translucent | Uniform, Transparent | Phase Separation |
| Chlorinated Paraffin[1] | Uniform, Transparent | Uniform, Transparent | Uniform, Transparent | Uniform, Transparent |
| Xylene Resin[2] | Uniform, Transparent | Uniform, Transparent | Uniform, Transparent | Uniform, Transparent |

Note
[1]Tradename: HC-150, manufactured by Tosoh Corporation.
[2]Tradename: NIKANOL-LLL, manufactured by Mitsubishi Gas Chemical Co., Inc.

EXAMPLE 4

The polymer obtained in Synthesis Example 2 was mixed with a plasticizer and a filler in proportions shown in Table 2 to prepare a resin mixture. 300 parts by weight of this resin mixture and 8 parts by weight of crude polymethylene polyphenyl isocyanate (MDI) prepolymer ("E21-1," manufactured by SUMITOMO BAYER URETHANE, CO., LTD.) were mixed and cast into a 5-mm-thick mold to obtain a cured sheet. The resulting cured sheet was white. After aging at 20° C. for 24 hours and then at 50° C. for 7 days, no foaming was observed in the cured sheet.

Further, the cured sheet was coated with a paint based upon a vinyl chloride resin ("VINYBON," manufactured by Kansai Paint Co., Ltd.), and paints based upon polyacrylate ("VINYDELUXE," manufactured by Kansai Paint Co., Ltd., and "HEKIDINE," manufactured by Daido Toryo Co., Ltd.), respectively, and each of the resulting paint coatings was observed after keeping it at 20° C. for 14 days. The results are shown in Table 3.

EXAMPLE 5

The polymer obtained in Synthesis Example 3 was mixed with a plasticizer, a filler and a curing agent in proportions shown in Table 2 to prepare a resin mixture. 420.01 parts by weight of this resin mixture, 54.6 parts by weight of a first urethane prepolymer (isocyanate content: 4.1 weight %) obtained by reacting a bifunctional polypropylene glycol having a molecular weight of 1000 with a xylene diisocyanate, and 7.1 parts by weight of a second urethane prepolymer (isocyanate content: 7.94 weight %) obtained by reacting a trifunctional polypropylene glycol having a molecular weight of 1000 with a xylene diisocyanate were mixed to provide a mixture A. The mixture A was cast into a 5-mm-thick mold to obtain a cured sheet. The resulting cured sheet was white. After aging at 20° C. for 24 hours and then at 50° C. for 7 days, no foaming was observed in the cured sheet.

Further, the same paints as in Example 4 were applied to the cured sheet to observe the state of the resulting coatings after aging at 20° C. for 14 days. The results are also shown in Table 3.

EXAMPLE 6

The polymer obtained in Synthesis Example 4 was mixed with a plasticizer, a filler and a curing agent in proportions shown in Table 2 to prepare a resin mixture. 370.01 parts by weight of this resin mixture, 18.5 parts by weight of the first urethane prepolymer (isocyanate content: 4.1 weight %), and 9.5 parts by weight of the second urethane prepolymer (isocyanate content: 7.94%) were mixed and formed into a cured sheet in the same manner as in Example 5. The resulting cured sheet was white and no foaming was observed after the same aging as in Example 5.

Further, the same paints as in Example 4 were applied to the cured sheet to observe the state of the resulting coatings after aging at 20° C. for 14 days. The results are also shown in Table 3.

Comparative Example 2

A resin mixture having a composition below was mixed with a curing agent mixture having a composition below and cast into a 5-mm-thick mold to produce a cured sheet.

|  | Parts by Weight |
| --- | --- |
| Resin Mixture |  |
| Polysulfide polymer ("THOKOL LP 55") | 100 |
| Plasticizer (butylbenzyl phthalate) | 30 |
| Filler (calcium carbonate) | 180 |
| Filler (titanium oxide) | 10 |
| Curing Agent |  |
| $PbO_2$ | 7.5 |
| Chlorinated paraffin | 2.5 |

The cured sheet was brown. Further, the same paints as in Example 4 were applied to the cured sheet to observe the state of the resulting coatings after aging at 20° C. for 14 days. The results are also shown in Table 3.

TABLE 2

| Composition | parts by weight | | |
| --- | --- | --- | --- |
|  | Example 4 | Example 5 | Example 6 |
| Polymer of Synthesis Ex. 2 | 100 | — | — |
| Polymer of Synthesis Ex. 3 | — | 100 | — |
| Polymer of Synthesis Ex. 4 | — | — | 100 |
| Plasticizer (Diocytl Phthalate) | 30 | — | 60 |
| Plasticizer (Diheptyl Phthalate) | — | 70 | — |
| Filler (Calcium Carbonate) | 180 | 240 | 205 |
| Filler (Titanium Oxide) | 10 | 10 | 5 |
| Curing Agent (Triethylenediamine) | — | 0.01 | 0.01 |

TABLE 3

| | State of Paint Coating | | | |
| --- | --- | --- | --- | --- |
| Paint Applied | Example 4 | Example 5 | Example 6 | Comparative Example 2 |
| VYNYBON | O | O | O | X |
| VINYDELUXE | O | O | O | X |
| HEKIDINE | O | O | O | X |

Note:
O: Not tacky.
X: Tacky.

COMPARATIVE EXAMPLE 3

A cured sheet was produced from a commercially available two-component type urethane sealant. After aging at 20° C. for 24 hours and then at 50° C. for 7 days, it was observed that the cured sheet was bloated due to foaming.

EXAMPLE 7

A cured sheet obtained in Example 4 was subjected to an accelerated weathering for 1000 hours by using a sunshine weatherometer. After the weathering, it was observed that the surface of the cured sheet was not cracked.

The cured sheet obtained in Example 4 was also subjected to accelerated weathering for two months by a sun light exposure test machine according to JIS Z 2381. Light reception was 121.44 $MJ/m^2$ (ultraviolet), 2210.00 $MJ/m^2$ (visible light), and 1649.89 $MJ/m^2$ (infrared). After the weathering, it was observed that the surface of the cured sheet was not cracked.

COMPARATIVE EXAMPLE 4

Cured sheets were produced from a commercially available two-component type urethane sealant and the same tests as in Example 7 were conducted by a sunshine weatherometer and a sun light exposure test machine. In this case, cracks were found on surfaces of the cured sheets in both tests.

EXAMPLE 8

The mixture A obtained in Example 5 was applied to a test of adhesiveness against tension using glass plate as the substrate material according to JIS A-5758. The test piece is cured at 50° C. for 7 days. The same test was conducted after accelerated exposure for a total of 1000 hours under sunshine weatherometer. The results are shown in Table 4.

COMPARATIVE EXAMPLE 5

A commercially-available urethane sealant was applied to a substrate of glass plate and cured at 50° C. for 7 days to conduct a tensile adhesion test according to JIS A-5758. After the same accelerated weathering as in Example 8, the cured product came off from the glass plate. The results are also shown in Table 4.

TABLE 4

| Test | Example 8 | Comparative Example 5 |
| --- | --- | --- |
| After curing (7 days at 50° C.) | | |
| Tensile Stress at 50% | 1.1 $kgf/cm^2$ | 2.7 $kgf/cm^2$ |
| Maximum Tensile Stress | 4.8 $kgf/cm^2$ | 7.5 $kgf/cm^2$ |
| Elongation at Break | 690% | 500% |
| Failure | Cohesive Failure | Cohesive Failure |
| After accelerated exposure (after curing, 1000 hrs under Weatherometer) | | |
| Tensile Stress at 50% | 1.4 $kgf/cm^2$ | — |
| Maximum Tensile Stress | 4.0 $kgf/cm^2$ | 1.8 $kgf/cm^2$ |
| Elongation at Break | 640% | 36% |
| Failure | Cohesive Failure | Interfacial Failure |

As described above in detail, since the curable composition of the present invention comprises a polysulfide polyether and a compound having two or more isocyanate groups in one molecule, it can produce, with no difficulties, a white cured product, which has been difficult to be obtained in conventional compositions which contain an inorganic oxidizing agent such as $PbO_2$, etc. as a curing agent. When compared with conventional urethane sealants, the curable composition of the present invention suffers less from foaming at the time of curing, thereby producing a cured product which has a good weathering resistance.

Further, since the polysulfide polyether used in the present invention is compatible with inexpensive phthalate plasticizers such as dioctyl phthalate (DOP), etc., which are not compatible with the polysulfide polymers, and shows a smaller viscosity, the amount of the plasticizer used can be reduced. This means that when a paint is applied to its cured product, plasticizers are less transferred to a paint coating, thereby preventing the softening of the paint coating.

Such curable compositions are suitable for sealants, adhesives, etc.

The present invention has been described by Examples, but it should be noted that any modifications are possible unless they deviate from the scope of the present invention defined by the claims attached hereto.

What is claimed is:

1. A curable composition comprising:
   (A) a polysulfide polyether having in a main chain:
   (i) 2-95 percent by weight of a polyether moiety represented by $-(R_1O)_n-$, wherein $R_1$ is an alkylene group having 2-4 carbon atoms, and n is an integer of 6-200;
   (ii) structural units represented by $-C_2H_4OCH_2OC_2H_4-S_x-$, and $-CH_2CH(OH)CH_2-S_x-$ wherein x is an integer of 1-5; and at both ends:
   (iii) a thiol group represented by $-C_2H_4OCH_2OC_2H_4-SH$, and/or $-CH_2CH(OH)CH_2-SH$;

and (B) a compound having two or more isocyanate groups in one molecule;
   a molar ratio of isocyanate groups contained in said component (B) to thiol groups contained in said component (A) being 0.5-4.0 isocyanate groups/thiol groups wherein said polysulfide polyether contains 3-70 percent by weight of a $-CH_2H_4OCH_2OC_2H_4-$ component, 1-50 weight percent of a $-CH_2CH(OH)CH_2-$ component and 1-60 weight percent of a polysulfide bond $S_x$.

2. The curable composition according to claim 1, further comprising tertiary amines.

3. The curable composition according to claim 1, wherein said component (B) is an isocyanate prepolymer which is obtained by reacting a polyether polyol with a polyisocyanate.

4. The curable composition according to claim 1, wherein said component (B) is an isocyanate prepolymer which is obtained by reacting an acrylic polyol with a polyisocyanate.

* * * * *